United States Patent [19]
Winkler

[11] 3,729,148

[45] Apr. 24, 1973

[54] MAGNETIC TAPE APPARATUS WITH GRADUATED BRAKE AND/OR MOTOR TORQUE FOR CONTROLLING TAPE WINDING

[75] Inventor: Klaus Winkler, Planegg, Germany

[73] Assignee: Siemens Aktiengesellschaft, Berlin and Munich, Germany

[22] Filed: Sept. 17, 1971

[21] Appl. No.: 181,380

[30] Foreign Application Priority Data

Sept. 23, 1970 Germany....................P 20 46 916.3

[52] U.S. Cl. ....................242/182, 242/75.51, 318/6

[51] Int. Cl.........................G11b 15/58, G11b 23/12

[58] Field of Search..................................................
242/182–190, 75.51; 179/100.2 R; 274/4 D, 11 D; 318/6, 7

[56] References Cited

UNITED STATES PATENTS

| | | | |
|---|---|---|---|
| 3,199,800 | 8/1965 | Reader | 242/184 |
| 3,229,927 | 1/1966 | Cohler | 242/184 |
| 3,250,480 | 5/1966 | Jacoby | 242/184 |
| 3,584,805 | 6/1971 | Lee | 242/184 |

*Primary Examiner*—Leonard D. Christian
*Attorney*—Carlton Hill et al.

[57] ABSTRACT

A magnetic tape apparatus where the tape feed is uncoupled from the inert tape coils with the aid of buffer systems, and the speed is controlled as a function of the increase and/or decrease of the tape past at least one gate, wherein passage of a barrier by the tape in one direction provides a highly increased brake torque and passage of the gate or barrier in the other direction provides a highly increased motor torque, either of which torques are markedly decreased after a certain time in synchronism with the operation of the tape control system.

4 Claims, 5 Drawing Figures

INVENTOR
Klaus Winkler
BY
Hill, Sherman, Meroni, Gross & Simpson
ATTYS.

Patented April 24, 1973 3,729,148

3 Sheets-Sheet 2

INVENTOR
Klaus Winkler
BY
Hill, Sherman, Meroni, Gross & Simpson
ATTYS.

Patented April 24, 1973 3,729,148

3 Sheets-Sheet 3

INVENTOR.
Klaus Winkler

BY Hill, Sherman, Meroni, Gross & Simpson
ATTORNEYS

MAGNETIC TAPE APPARATUS WITH GRADUATED BRAKE AND/OR MOTOR TORQUE FOR CONTROLLING TAPE WINDING

BACKGROUND OF THE INVENTION

1. Field of the Invention

This invention relates to tape feed systems, and more particularly to apparatus for controlling the speed of winding and unwinding of magnetic tape coils in data processing units.

2. Description of the Prior Art

In data processing installations, the magnetic tape feed in magnetic tape units is customarily uncoupled from the inert tape coils by buffering, or example, through the use of vacuum chambers. The controlling of the tape coils is thereby accomplished by way of a control circuit whose objective it is to maintain a certain degree of loading of the buffer system. Depending on the type of scanning of the degree of loading of the buffer system, such a control circuit may operate on either an analog basis or a digital basis. In the case of magnetic tape units with low tape speed, a digital, primarily a two-point control is used for greater simplicity and lower cost. Therefore, the buffer system is divided by a pair of scanning barriers, for example, optical scanning barriers, into three areas, namely a brake area in the center and an operating area for winding and unwinding respectively below and above the brake area. The length of the individual areas and, thus, the length of the buffer system is a function of the inert masses of the coils of the tape and their drives, of the tape speed, and of the tape coil acceleration, based on the motor and/or brake torques employed. The tape winding acceleration has an upper limit caused by the appearance of slipping of the coil, however, so that at a given tape speed and with the use of standard tape coils, there will necessarily result a minimum length for the buffer system.

In magnetic tape apparatus having low tape speed which consequently operate under normal conditions with relatively short buffer systems, problems arise for example, when despite the provision of short buffer systems, a "fast rewinding" is to be accomplished at relatively high tape speed. Because, as mentioned above, the length of the buffer system is, among other factors, a function of the tape velocity, the relatively short buffer systems no longer suffice for the fast rewind operation. This fact can be considered as facilitating the solution of the problem that this case of operation moves only in one direction and without intermediate stops. Thus, a different division of the buffer system into operating and braking areas may be advisable, for example, for controlling one or even both tape coils through the utilization of a single operating barrier disposed in the center of a buffer system. As a result of such a measure, the possible speed may be substantially increased, perhaps doubled over the normal operation during recording and reading, and/or with an appropriate control of both coils, the speed could be further increased, perhaps tripled or quadrupled. However, these measures are insufficient when the "fast rewinding" is to be executed at about six times the normal speed or higher, as may be possible in the case of direct recoiling from coil to coil in conveying systems.

SUMMARY OF THE INVENTION

In view of the foregoing, it is the primary object of the present invention to provide improved techniques for controlling magnetic tape apparatus.

According to the invention, motor torque or braking torque of a unique nature is provided in response to the magnetic tape passing a sensing barrier. This unique torque is initially of a relatively high value with respect to that heretofore utilized and is stepped, after a certain time, to a much lesser value. As a result, the deviation from the mean number of revolutions of the coil is less than that encountered under prior normal operation. With less loop deflection, faster recoiling is made possible for a given identical chamber length than was heretofore possible in prior art apparatus.

BRIEF DESCRIPTION OF THE DRAWINGS

Other objects, features and advantages of the invention will best be understood from the following detailed description taken in conjunction with the accompanying drawings, in which.

DESCRIPTION OF THE PREFERRED EMBODIMENT

Figure 1:
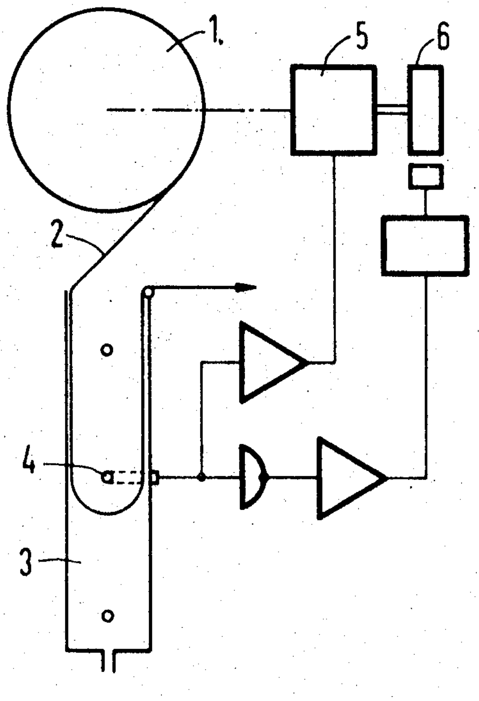
FIG. 1 is a schematic representation of a portion of a magnetic tape apparatus for controlling tape winding speed.

The magnetic tape arrangement of FIG. 1 comprises a tape coil 1 carrying a magnetic tape 2 which moves into a buffer chamber 3. A scanning barrier 4, such as an optical scanning barrier, is disposed inside the buffer chamber 3 for scanning the position of the tape loop. This scanning barrier 4 determines the limit between two types of operation of the drive for the tape coil 1, namely acceleration and braking. If the tape loop arrives above the barrier 4, the tape winding is too slow and requires acceleration, but if the tape loop arrives below the barrier or gate 4, the tape winding on the coil 1 is too rapid and must be decelerated.

Figure 2:
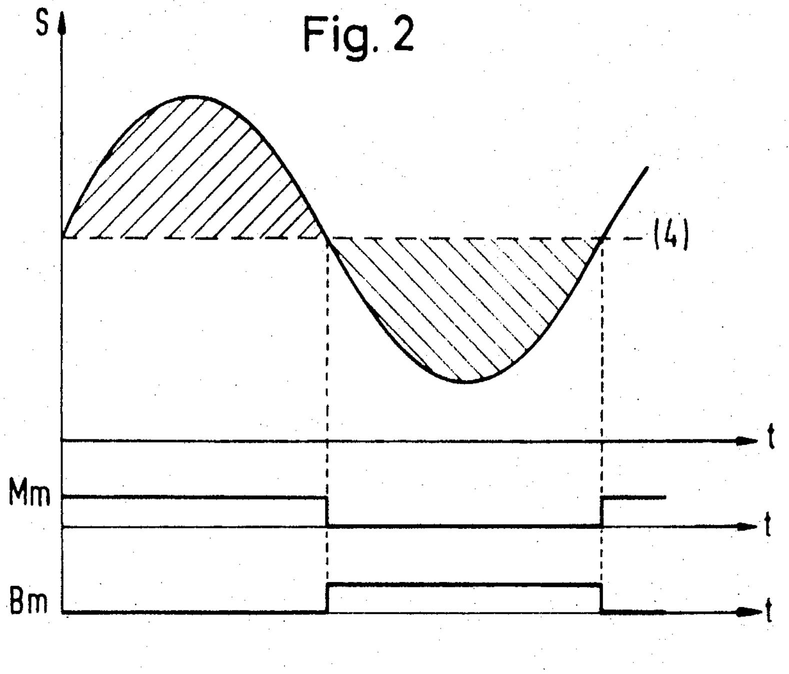
FIG. 2 is a graphical illustration of the associated motor torque Mm and/or brake torque Bm at various magnetic tape loop deflections S.

Both of the foregoing operations are illustrated in FIG. 2 wherein the first part of the diagram illustrates a displacement of the tape above the scanning barrier 4 as would occur when the tape winding is too slow, and the second part of the diagram illustrating movement of the tape below the scanning barrier 4 which occurs when the winding of the tape is too fast. Accordingly, in the lower portion of FIG. 2, it can be seen that for too slow of a tape winding speed, the motor 5 (FIG. 1) is energized upon exceeding the barrier 4 and remains energized until the tape loop moves below the barrier 4. At that moment, the brake 6 is operated and remains in operation until the tape loop again moves above the scanning barrier 4. Thus, the tape loop constantly shuttles about the scanning barrier 4 and the tape coil 1 is wound or unwound with the proper average speed. The circuit illustrated in FIG. 1 includes an inverter or NAND gate 7 connected to the scanning barrier 4 and an amplifier 9 interposed between the NAND gate 7 and the brake 6 for controlling the operation of the brake. The circuit further includes an amplifier 8 connected between the scanning barrier 4 and the motor 5 for controlling operation of the motor. The provision of inversion of the output signal of the scanning barrier 4 ensures that only the motor 5 or the brake 6 is actuated at any given time.

When considering the speed of the magnetic tape in the individual phases of its displacement curve, it becomes clear that in each case of operation at the point of reversal, that is at maximum loop deflection in either direction, the speed of the tape coil equals the theoretic tape speed. Consequently, a complete cycle should be divided into four, instead of only two, states of operation of the coil drive for the tape. This corresponds approximately to the D-portion of an analogous P-D control and is thus possible only under continuous scanning, or in case of digital scanning, it is approximated by adding a small tachometer driven by the tape to produce a D-portion of a control, as otherwise no criterion can be found for the point of reversing the tape loop. A control loop with P-D control comprises two control loop members, one of which has P behavior and the other one of which has D behavior. The output signals of the two control loop members are summed for performing the system control operation. P behavior means that the output signal of the control loop member is proportional to the input signal of that control loop member; whereas, D behavior means that the output signal of the corresponding control loop member is the differentiated input signal.

Figure 3:
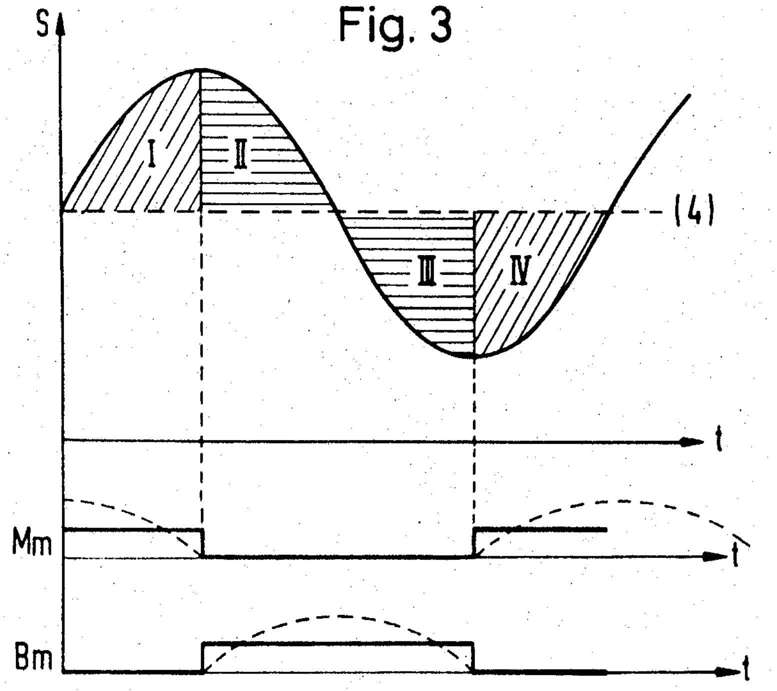
FIG. 3 is a graphical illustration of the division of a tape displacement cycle into four states and the application of motor and braking torque as a differential of the displacement curve.

FIG. 3 illustrates the conditions for a division of the entire cycle into four states of operation, instead of only two states. When the tape winding speed is at the point of reversing and equal to the theoretic speed, the tape winding speed must be too slow in Sections I and IV, while the winding speed is too fast in Sections II and III. This shows, as can be seen from the lower portion of the diagram, that in Sections I and IV of the cycle, the motor must be energized, while in Sections II and III, the brake must be energized. This energization can take place on an analog basis (shown in broken lines) or on a digital basis. However, both solutions have the disadvantage of being relatively costly. Consequently, the present invention is based on the concept of creating a simpler digital control for the tape coils of a magnetic tape apparatus which functions without an additional tachometer and yet offers almost the same operational advantages as a digital control having a tachometer or an analog control of the tape coils.

The foregoing is achieved, according to the present invention, by providing that upon the tape passing the barrier in one direction, a highly increased brake torque is applied to the brake and while upon the tape passing the barrier in the other direction, a highly increased motor torque is applied to the motor. In the case of each application of torque, the torque is markedly decreased after a certain time in synchronism with the operation of the control system and as a result, the deviation from the mean (theoretic) number of revolutions of the coil is less than that encountered heretofore under normal operation as illustrated in FIG. 2, that is, the loop deflection decreases. Consequently, at identical chamber length, there is provided the possibility of faster speeds for winding and unwinding.

Figure 4:
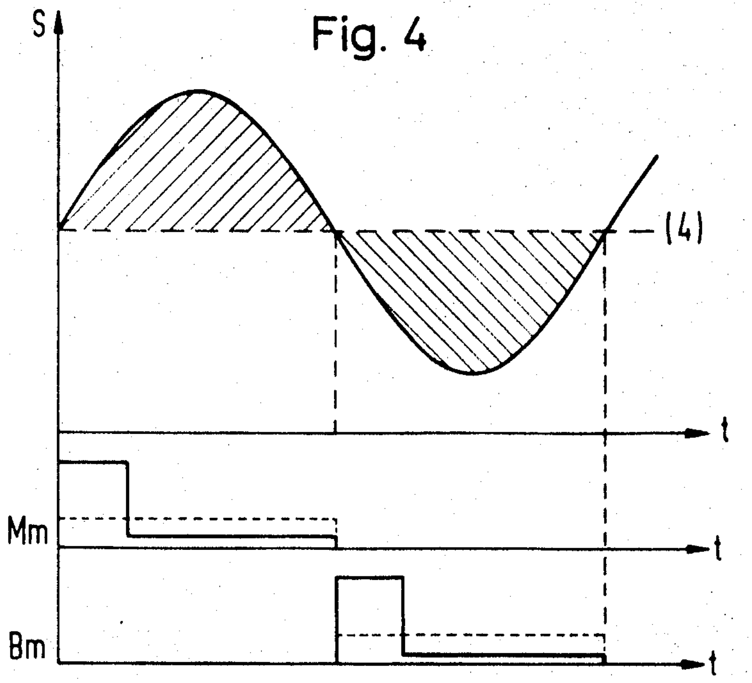
FIG. 4 is a graphical illustration of the application of motor and braking torque in unique steps according to the circuit of FIG. 5.

FIG. 4 illustrates the motor torque and/or brake torque application in a system, such as illustrated in FIG. 1, according to the present invention, in response to various tape loop deflections. In FIG. 4, the passage of the tape across the scanning barrier 4 in one direction causes the application of a highly increased torque with respect to the torque which would normally be applied to the motor 5 under the normal operation represented in FIG. 2. Passage of the tape 2 across the scanning barrier 4 in the other direction causes the application of a highly increased braking torque to the brake 6. However, the highly increased torque in either case is effective only for a certain time synchronized with the control system and then changes to a torque which is markedly decreased with respect to that which would be applied in normal operation. The motor torque and brake torque at normal operation are illustrated in FIG. 4 as respective superposed broken lines to illustrate the comparative torque values. It will therefore be understood that the present invention utilizes a method and apparatus for providing torque to the motor 5 and brake 6 as illustrated in FIG. 4. This technique involves the immediate application of a high torque and the subsequent application of a low torque after a certain time delay which is effected through the operation of the amplifiers 8, 9 to provide correspondingly stepped outputs to the respective controlled apparatus 5, 6.

Figure 5:
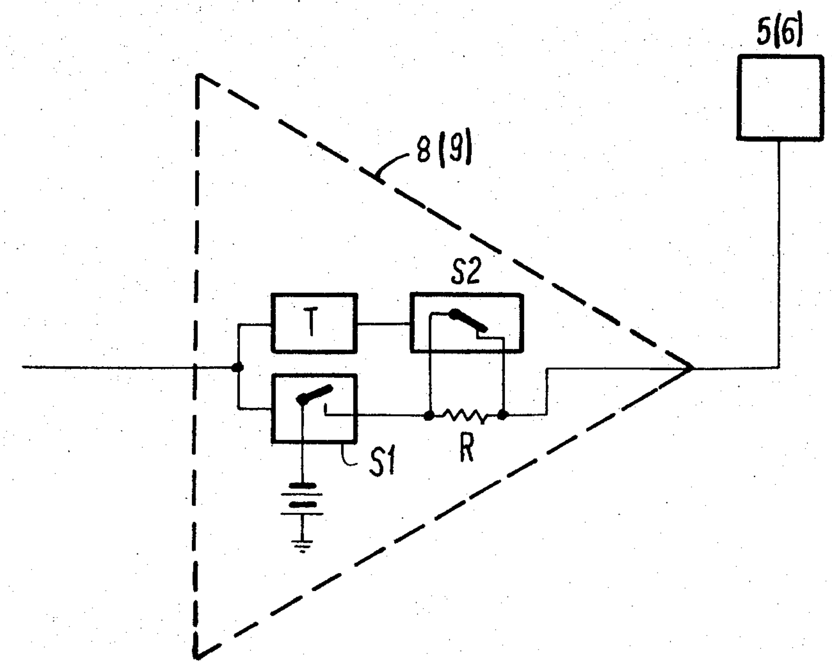

Referring to FIG. 5, apparatus for providing the stepped torque energization of the motor or brake is symbolically illustrated as comprising a first open switch S1 connected between an electrical supply and the controlled device 5(6) via a second closed switch S2 which has an impedance R connected in shunt therewith. The switches S1, S2 are operated in response to the tape passing the sensing barrier 4 (FIG. 1) in a sequential fashion due to the interposition of a time delay means T, so that the electrical supply voltage is first applied to the device 5(6) via the switches S1, S2 in series, then via the switch S1 and the impedance R in series after the delay time of the delay means T which opens the switch S2. The impedance R lowers the voltage magnitude applied to the device 5(6) and effects a step down in torque. This condition is maintained until the tape passes the barrier 4 in the opposite direction.

The problem on which the invention is based was explained initially on the basis of operating the tape system in a "fast rewinding" mode. However, the invention is by no means limited to this particular operational case and may, of course, be utilized at normal operating conditions. In addition, changes and modifications of the present invention may become apparent to those skilled in the art without departing from the spirit and scope of my invention, and it is to be understood that I intend to include within the patent warranted hereon all such changes and modifications as may reasonably and properly be included within the scope of my contribution to the art.

What I claim is:

1. In a magnetic tape apparatus of the type wherein the tape feed is uncoupled from the inert tape coils with the aid of a buffer system, and the tape speed is controlled as a function of the passage of the tape across at least one sensing barrier to control the operation of a motor and a brake, the improvement therein comprising first means responsive to the passage of the tape across the barrier in a first direction to apply a stepped braking torque at the brake, and second means responsive to the passage of the tape across the barrier in the other direction to apply a stepped driving torque at the motor, each of said torques having the character of a relatively high initial and constant value for a predetermined period of time followed by a relatively low constant value until passage of the tape back across the sensing barrier.

2. The method of controlling tape feed in a magnetic tape system which includes a buffer system to uncouple the tape feed from the inert tape coils wherein the tape speed is controlled as a function of the passage of the tape across at least one sensing barrier, said method comprising the steps of applying a stepped braking torque of a relatively high constant value followed by a relatively low constant value in response to sensing tape passage across the barrier in a first direction, and applying a stepped driving torque at the motor, each of said torques having the characteristic of a relatively high initial and constant value for a predetermined period of time followed by a relatively low constant value until passage of the tape back across the sensing barrier in response to sensing passage of the tape across the barrier in a second direction.

3. In a magnetic tape apparatus of the type wherein the tape feed is uncoupled from the inert tape coils with the aid of a buffer system, and the tape speed is controlled as a function of the passage of the tape across at least one sensing barrier to control the operation of a pair of torque applying devices including a motor and a brake, the improvement therein comprising: means responsive to the passage of the tape across the sensing barrier to operate at least one of the torque applying devices to apply a stepped torque to the tape coils of a first magnitude for a predetermined interval followed by a much lesser second magnitude until the tape repasses the sensing barrier.

4. The improvement set forth in claim 3, wherein said means comprises time delay means, first and second switching means connected in series between said one torque applying device and an electrical supply, said first switching means normally open and said second switching means normally closed, an impedance in parallel with said second switching means, said first and second switching means connected to and operatively controlled by the sensing barrier and said time delay means interposed between said second switching means and the sensing barrier to delay opening of said second switching means for said predetermined interval.

* * * * *